Sept. 8, 1931.  R. H. WENTORF  1,822,257
COOKER
Filed Dec. 26, 1928
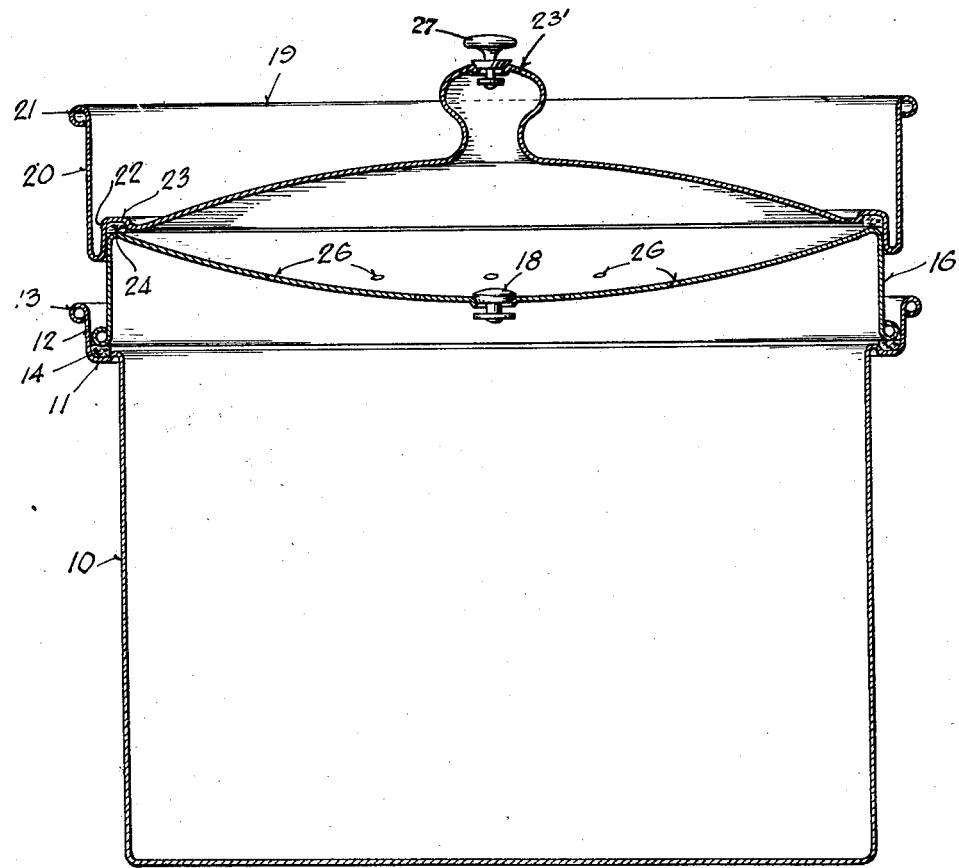
INVENTOR.
ROBERT H. WENTORF
BY
ATTORNEYS.

Patented Sept. 8, 1931

1,822,257

UNITED STATES PATENT OFFICE

ROBERT H. WENTORF, OF WEST BEND, WISCONSIN, ASSIGNOR TO WEST BEND ALUMINUM COMPANY, OF WEST BEND, WISCONSIN, A CORPORATION OF WISCONSIN

COOKER

Application filed December 26, 1928. Serial No. 328,474.

The invention relates to an improved cooker, and its object is to produce a cooker which will function in such manner as to conserve all of the beneficial properties of the articles of food being cooked, and increase the nutritive value of the latter.

The invention resides in a cooker of simple and economical construction, in which the vapors generated in the process of cooking, and which are surcharged with the properties of great food value, are condensed and preserved instead of being driven off and wasted. In the condensation thus effected, these essential elements are returned to the sources of their origin and retained with the food being prepared, with highly beneficial results both in flavor and food value.

The invention resides more specifically in an arrangement of a cooking vessel with a closure for the top, the latter being seated upon the vessel in such manner as to ordinarily prevent the escape from the vessel of the surcharged vapors generated by the heat in cooking the articles of food. The top closure referred to is provided with a pressure operated vent or valve which is normally closed, so as to confine the vapors to the vessel. But when the pressure of the vapors within the vessel rises sufficiently, the vent or valve will be operated to relieve the pressure with the vessel. But the portion of the vapor passed out from the vessel in the manner described, is not permitted to escape or become wasted.

A condenser is fitted upon the top closure, so as to trap the passed portion of the vapor in the space between the top of the closure and the bottom of the condenser. Such condenser is formed as a pan adapted to contain a quantity of water, the presence of which latter acts with a reducing effect upon the bottom of the pan, and serves to condense the trapped vapor very rapidly. Such condensation flows back into the vessel, through the vent or valve in the frequent periods that the latter is operating, or through minute perforations in the top of the closure.

Having thus outlined the nature of my invention, I will now describe the same in connection with the drawing herewith in which is shown in vertical, central section, an improved cooker constructed in accordance with my invention.

In the drawing, the numeral 10 indicates a cooking vessel, the rim at the open end of which is formed as a circular seat by turning the top margin of the annular wall outwardly, as at 11, and then upwardly to form a low wall, as at 12. The upper edge of the wall 12 may be finished and reinforced by a circular bead 13. A groove 14 may be formed in the seat 11 for the reception of a suitable gasket 15, preferably formed of cork.

The closure top 16, is formed as an inverted pan, the free edge of the wall of which is formed with a circular bead or foot 17, adapted to rest upon the seat 11, or upon the gasket 14 placed therein, so as to sufficiently seal the joint by the weight of the parts supported thereon, and ordinarily prevent the escape of the steam generated in the cooking operation. The bottom of the closure 16 is pressed inwardly so as to form a convex surface extending toward the vessel, and the center of the downwardly extending portion is perforated for the reception of a vent or valve 18. The latter is seated by the action of gravity so as to normally close the perforation, but when the pressure at the inside of the vessel reaches a certain point, the valve 18 will be lifted, and the excess pressure relieved by the passage of vapor through the valve opening. As the pressure becomes relaxed, the valve will again be seated, to confine the vapors to the vessel.

The condenser 19 is formed as a pan, the upstanding circular wall 20 of which may be provided with a reinforcing bead 21 at its upper margin. The bottom of the condenser 19 preferably has the peculiar cross section shown, in which the lower portion of the wall 20 is returned as at 22, and then extended inwardly as at 23 in the formation of the bottom of the pan. A circular channel may be formed at the underside of the horizontal inward extension 23, for the reception of a sealing gasket 24, preferably of cork, as before, to make a tight joint. From the circular channel at the under side, the bottom of the condenser 19 rises as a cone of low altitude, so as to provide a concave under side. The opposed concavities of the closure and condenser form an open chamber or trap for collection and condensation of the vapors passing from the vessel. A knob 23' for lifting the condenser, may be formed conveniently as a part of the structure. The returned lower portion 22 of the circular wall 20 constitutes a flange which is adapted to encircle the top of the closure 16, and position the condenser upon the closure 16.

In operation, the articles to be cooked are placed in the vessel 10, the closure top 16 applied, the condenser 20 positioned upon the latter, and the open pan of the condenser filled with water. The weight of the water in the pan acts to seal the two joints sufficiently, to prevent the escape of the vapors to the atmosphere at any point during the cooking operation, that is, under normal conditions of operation. Under ordinary pressures, the vapors created by the heat will be confined to the vessel 10 by the closure 16, but when such pressure exceeds a certain point, the valve 18 will be lifted, and the pressure will be relieved by the passage of vapors into the trap or chamber formed by the opposed concave surfaces of the top 16 and the condenser 20. In coming into contact with the water-cooled under surface of the condenser 20, the vapors will be condensed and will flow back through the perforations in the top of the closure 16. Cooking is best effected when the heat is sufficient to generate a vapor pressure, and at such time, the operation of the valve is so frequent as to be practically continuous. This condition permits the condensation to flow back into the vessel without appreciable delay.

Inasmuch as the relative diameters of the flange at the lower side of the condenser and the upstanding wall surrounding the top of the vessel, are such as to permit one to be seated in the other, the vessel may be used in some instances without the closure top. To avoid a vacuum seal in cooling, the bottom of the closure 16 may be provided with minute perforations 25, which will permit the passage of negligible amounts only of vapors, and not affect the described operation of the valve 18. The vacuum seal which occurs when the heated vessel and its contents are permitted to cool before the cover is removed, may be broken by opening a small valve 27, in the top of the knob 23'. The said valve may be of any conventional form.

Having thus described my invention, what I claim and desire to secure by Letters Patent of the United States, is:

1. A condensing cooker comprising a vessel, a closure top for the vessel, a condenser provided with means for holding water positioned upon the closure top with a space constituting a vapor condensing chamber between the two last mentioned parts, and a vapor operated valve in the closure top leading from the vessel to the condensing chamber whereby vapors passing through the valve into the said chamber are condensed in the contact with a water-cooled surface.

2. A condensing cooker comprising a vessel having a rim provided with a seat, a closure top for the vessel supported in the said seat, a condenser provided with means for holding water and having a flange at its lower side for positioning the condenser upon the closure top, and a normally closed vapor operated valve in the closure top for permitting the passage of vapor from the vessel into the space between the closure top and the condenser whereby vapors passing into the said space are condensed in the contact with a water-cooled surface.

3. A condensing cooker comprising a vessel having a circular seat at its top, a closure member having a depending circular wall which rests upon the said seat and the top of which extends inwardly toward the vessel to provide a space constituting a condensing chamber, a valve in the said top to permit passage of vapors from the vessel, and a condenser formed as a pan for receiving water, the said condenser having at its bottom a circular flange for positioning the condenser upon the closure member.

In testimony whereof, I have signed my name at West Bend, this 13th day of December, 1928.

ROBERT H. WENTORF.